United States Patent Office 3,464,184
Patented Sept. 2, 1969

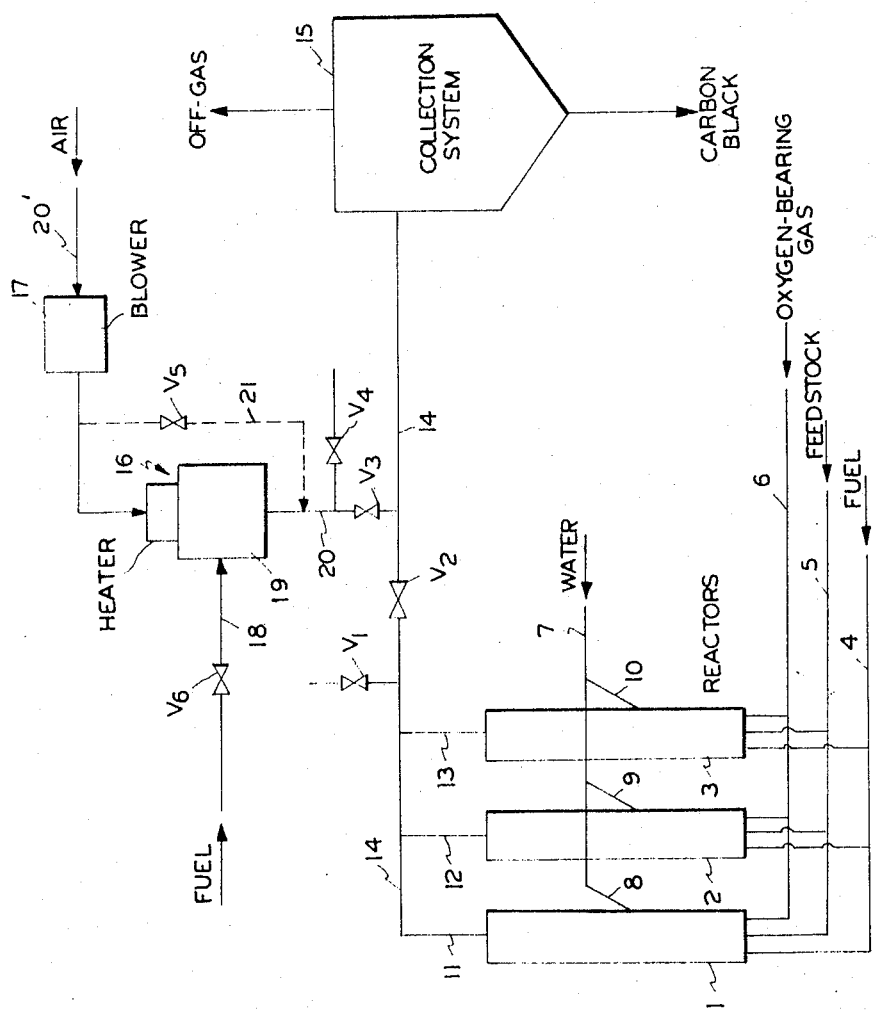

3,464,184
METHOD AND APPARATUS FOR PREVENTING CONDENSATION IN A COLLECTION SYSTEM
William R. Wright, Rockport, Tex., assignor to Ashland Oil & Refining Company, Houston, Tex., a corporation of Kentucky
Filed June 21, 1965, Ser. No. 465,481
Int. Cl. B01d 46/00
U.S. Cl. 55—97                                                         8 Claims

ABSTRACT OF THE DISCLOSURE

A collection system for separating solids from hot, moisture-laden gases equipped with apparatus for causing heated gases of relatively low moisture content to circulate through the system prior to introduction of the hot, moisture-laden gases and/or to purge the system of said moisture-laden gases upon shutting down of the system.

---

This invention relates to carbon black. More particularly, this invention relates to improvements in methods and apparatus for the starting up and shutting down of a carbon black producing system.

Of the various types of carbon black now known to persons skilled in the art, furnace carbon blacks are the most widely used. They are useful in a wide variety of applications, especially as pigments and fillers.

The improvement of this invention is applicable to the preparation of furnace carbon blacks by partial combustion and/or thermal decomposition of a gaseous or liquid hydrocarbon. In general, this well known method of preparation is conducted by burning a hydrocarbon in the presence of a deficiency of oxygen so that the heat generated by partial combustion of the hydrocarbon will decompose the remainder of the hydrocarbon and/or by subjecting a hydrocarbon to the heat generated by the substantially complete combustion of a second and generally different hydrocarbon.

Carbon black producing systems for the preparation of furnace carbon blacks by partial combustion and/or thermal decomposition, to which the improvement of this invention is applicable, are well known. Basically, the components of a carbon black producing system are a highly specialized furnace, called a "reactor," and a collection system which may include one or more units for recovering carbon from the combustion gases and decomposition products produced in the reactor. Conduit means interconnect these two major components as well as the individual units of the collection system. In practice, a carbon black producing system generally includes several reactors which empty a mixture of the combustion gases and suspended decomposition products known as "smoke" into a common conduit leading to the collection system. The reactors may also have provision for introducing a spray of water or other coolant (quenching) into the smoke within the reactor itself to lower the smoke temperature before the smoke enters the collection system and/or the first unit of the collection system may be a tower or the like having spray means for quenching the smoke and thereby lowering its temperature. At present, collecting systems generally may include such units as the coolers or quenching means referred to above, centrifugal agglomerators, sonic agglomerators, electrostatic precipitators, cyclones, contact chambers, oil baths, bag filters and wet scrubbing towers. A given collection system will not necessarily contain all of the units enumerated above and their combination and number may vary from one carbon black producing system to another depending on the space and units available, carbon content of the smoke, the degree of recovery sought and economic considerations. A not uncommon type of collection system now in commercial operation includes a cooler or quenching means for lowering the temperature of the smoke, an electrostatic precipitator for "agglomerating" the smoke, a series of cyclone separators which will recover the major part of the carbon black and a bag filter unit for recovering the carbon black remaining in the smoke after its passage through the cyclone separators. A somewhat simpler collection system might include a cooler or quenching means, one or more agglomerators, and a bag filter unit. The complete details of carbon black reactors, the various types of collection units and the manner of arranging them into a carbon black producing system are well known to those skilled in the art.

On starting up a carbon black producing system according to known practice, the reactors are brought up to an internal operating temperature of about 2300° F. or higher over a period of several days by slowly increasing the fuel and air feeds to the reactor. During this heat up cycle when the temperature of the hot combustion gas effluent from the reactor has reached roughly 600° F., the gases are thereafter quenched, by introduction of quench water into the reactor, to keep the effluent gas temperature from rising above said temperature as the internal temperature of the reactor continues to rise. Until the fuel and air rates have been gradually raised to substantially normal operating levels and internal reactor temperature has stabilized, the combustion gases are routed to the atmosphere and cut-off valve provided in the conduits leading from the reactors to the collection system are kept closed. When normal fuel and air rates have been reached, the valves in the conduits to the collection system are opened and corresponding valves in the conduits for venting the combustion gases to the atmosphere are closed. At this stage in the operation, the quenched combustion gases traveling from the reactor to the collection system comprise roughly 40% water vapor by volume. Assuming that the collection system has previously been idle, as is usually the case, the internals of the collection system are cooler than the quenched gases. Initially therefore, the relatively cooler collection system internals condense water from the quenched gases. The resultant condensate corrodes the metal portions of collection equipment and is especially harmful to the filter bags usually employed in bag filter units. Eventually, after a waiting period of at least several hours, during which condensation continues, the internals of the collection system gradually heat up and eventually become hotter than the dew point of the combustion gases. Then, no more condensate forms, and the previously deposited condensate gradually dries out. It should be noted that when the production of carbon black is attempted prior to complete drying out of the internals of the collection system, the carbon black mixes with the condensate and, in the course of drying out, "cakes" on the internals. This cake deposit plugs up various components of the collection system, such as the seals at the outlets of cyclones and the fabric of the filter bags in the bag filter unit. Such bags, which are expensive, can be permanently damaged in this manner. Thus, no attempt is ordinarily made to make carbon black until all condensation has been removed from the collection system.

After the system has definitely been cleared of moisture, as described above, the rates at which air and fuel are supplied to the reactors are adjusted towards a stoichiometric mixture to give an "inert" off. gas. An oxygen content of less than about 5% is considered satisfactory. The entire system is then operated at this "inert" setting for about 15 minutes, or for such time as is found necessary to purge any excess oxygen from the system. After purging the system, the hydro carbon feedstock for making carbon black is injected into the reactors. Air and fuel can then be adjusted to the desired production settings.

Conventional shutting down procedure involves stopping the introduction of the hydrocarbon feedstock and adjusting all reactors to an inert setting. The system is then purged of carbon black. Next, the reactors are adjusted to an exces oxygen setting. Thereafter, the collection system can be shut down by by-passing the reactor effluent to the atmosphere and closing the conduit from the reactors to the collection system. The gases remaining in the collection system are heavily laden with water vapor. As the idle collection system cools, the vapor condenses out on the internals of the collection system with the same ill-effects discussed above in connection with the conventional starting-up procedure.

As can be seen from the above discussion, conventional starting-up and shutting down procedures involve serious disadvantages, including wetting down of collection system internals and a lengthy collection system warm-up period, during which the reactor is operated at full heat load without producing any carbon black. Such procedures are wasteful of fuel and reactor time and unduly punish the components of the collection system. Deposite the serious waste and damage of equipment resulting from the above problems, apparently very little attention has been given to eliminating them. Clearly, there is a demand for improved methods and apparatus for starting up and shutting down carbon black producing systems.

Objects

It is a principal object of the present invention to fulfill the above demand. Still another object of this invention is to provide a process and apparatus for starting up and shutting down a carbon black producing system without condensation occurring on the internal surfaces of the collection system, thereby greatly reducing corrosion of the internal metal part. A particular object of this invention is to provide a process and apparatus for starting up and shutting down a carbon black producing system in which wetting of the fabric of the filter bags is eliminated or at least greatly reduced, extending the life of the same. Still another object of the present invention is to provide a process and apparatus which reduces the time necessary for starting up a carbon black producing system. Other objects and advantages of the invention will be apparent to one skilled in the art upon careful consideration of the drawings and the description of the invention which follows.

Summary of the invention

In accordance with the invention, the internals of a collection system are readied for use by heating them with air of relatively low moisture content. Thus, the internals of a collection system intended for use in the collection of solids from a first gaseous medium bearing water vapor, which internals have a temperature lower than the dew point of said medium, are readied for their intended use by passing therethrough sufficient quantities of a second gaseous medium having a temperature in excess of the dew point of said first gaseous medium and a dew point below the temperature of said internals.

Further in accordance with the invention, the internals of a collection system are readied for shut-down by passing therethrough heaed gases of relatively low moisture content. Thus, during or prior to shut-down to a given temperature, the internals of a collection system which has been in use in the collection of solids from a first gaseous medium having a dew point above said given temperature are purged with a second gaseous medium having a dew point below said given temperature.

Further, in accordance with the invention, a carbon black production system is provided in which there is at least one carbon black reactor for the conversion of a hydrocarbon feedstock to carbon black in the presence of hot combustion gases, said reactor having a discharge outlet for said carbon black and hot combustion gases; a collection system for separating the carbon black from the combustion gases, said collection system having interior surfaces susceptible to condensation of moisture; a conduit system inter-connecting said discharge outlet with the collection system; quenching means in the carbon back production system upstream of at least part of said collection system for quenching the hot combustion gases with water; heater means for heating a gaseous heating medium of relatively low moisture content, said heater means having an outlet in communication with said collection system; and means for causing said gaseous heating medium to flow from said heater means through said collection system, while substantially no gases, normal leakage expected, are flowing from said reactor through said collector system.

Brief description of the drawing

The drawing is a schematic diagram of a carbon black-producing system provided with the improvement of this invention.

Those details of the reactors, the collection units and their arrangements in the collection system and conduit system which are not essential to an understanding of the operation of the invention have been omitted, since these details are all well known to persons skilled in the art.

Description of the preferred embodiments

In accordance with that preferred embodiment of the apparatus of the present invention which is disclosed in the drawing, a plurality of reactors, 1, 2, and 3, is provided. These reactors may be of any type falling within the furnace carbon black reactor category. For example, U.S. Patent 3,060,003, granted to David C. Williams on Oct. 23, 1962, discloses a reactor that is suitable for use in connection with the present invention. Also, any other type of furnace carbon black reactor may be used, there being no intention to limit the invention to any particular type of reactor.

Generally, furnace carbon black reactors are provided with conduit means such as 4, 5, and 6 for the purpose of introducing hydrocarbon fuel, hydrocarbon feedstock, and an oxygen-bearing combustion-supporting gas into the reactors. Certain types of reactors do not require the use of separate feedstock and fuel, a portion of the hydrocarbon feed being burned to provide the necessary heat for thermally dissociating the remainder thereof. In such reactors, the provision of separate feedstock and fuel conduits is of course unnecessary and one of them may be omitted. While the conduits 4, 5, and 6 are represented in the diagram as entering the ends of the reactor, it should be understood that in reactors of other types such conduits may enter elsewhere; e.g. in the tangential entry types of reactors the oxygen bearing gas and fuel are introduced tangentially from alongside the reactors, and when using such reactors it will be necessary to reposition the fuel and oxygen-bearing gas conduits accordingly. Corresponding modifications will be required for other reactors in which the fuel, feedstock, and oxygen bearing gas are introduced at still other points.

In accordance with usual practice, the carbon black producing system is provided with some means for quenching the hot products of combustion and carbon black produced in the reactor. Such means may be located within the reactor and/or downstream thereof. When the quenching means is located within the reactor, it ordinarily includes a water supply conduit 7 and branch conduits 8, 9 and 10 leading into each reactor. The branch conduits extend through the walls of the reactor to the interiors thereof, terminating in an outlet means, such as a nozzle, to disperse water directly into the combustion gases and suspended carbon black being produced in the reactors.

In accordance with usual practice, each of the reactors has a discharge outlet, the discharge outlets of the reactors 1, 2 and 3 being 11, 12 and 13, respectively. The discharge outlets, in turn, are connected with and discharge into a conduit system 14 extending from the reactor outlets to the collection system 15. The collection system includes any one or more devices for separation or for facilitating separation, of colloidally dispersed solids from gases. Many such devices are known to persons skilled in the art, a number of them having been described above. Therefore, such devices are represented by the symbol 15 in the accompanying drawing, it being understood that such symbol refers to any one or more of the known collection devices.

In accordance with the invention, the above described system is provided with conduit means 20, constituting part of conduit system 14, for withdrawing a relatively dry gaseous heating medium from a source of such medium. Where the gaseous medium is air, it may be withdrawn directly from the atmosphere. However, combustion gases and a variety of gases from other sources may also be used. The system is also provided with heater means, the heater means being connected with the conduit means 20. In the preferred embodiment of the invention, the heater means is a combustion type heater 16 with an associated blower 17 for force-feeding air or other combustion supporting gas into the heater. Fuel is admitted to the heater through a conduit 18 regulated by valve $V_6$. Within the heater is a chamber 19 where the combustion takes place. The chamber 19 is in communication with the internals of the collection system 15 through conduit means 20 and conduit system 14. Preferably, blower 17 has sufficient capacity to provide an excess of oxygen in respect to the amount of fuel being consumed in the heater 16. That is, the blower may supply more oxygen than is actually required for combustion of the fuel. This makes it possible to employ an optional conduit 21 from blower 17 to conduit 20 for by-passing excess air around the heater and for adding such excess air to the combustion gases produced in chamber 19. Thus, the temperature supplied to the collection system through the conduit system 14 may be controlled by blending the combustion gases produced in chamber 19 with a predetermined proportion of air, such proportion being readily controllable by any suitable means such as valve $V_5$.

In order to control the movements of the smoke from the carbon black reactors and the gaseous heating medium from conduit 20, valves $V_1$, $V_2$, $V_3$, and $V_4$ are provided. Valve $V_1$ opens out of conduit system 14 upstream of the point where conduit 20 from the heater means enters conduit system 14. Valve $V_1$ has its outlet in communication with the atmosphere, so that when valve $V_1$ is opened, the portion of the conduit system immediately downstream of the reactor discharge outlets 11, 12 and 13 is vented to the atmosphere. Valve $V_2$ is located in conduit system 14 just downstream of valve $V_1$. Valve $V_2$ is adapted to close off communication between those portions of conduit system 14 upstream and downstream of said valve. Valve $V_4$ has its inlet connected to line 20. Its outlet is in communication with the atmosphere. The opening of valve $V_4$ will put conduit 20 in communication with the atmosphere, so that any gases flowing therein may escape. Valve $V_3$ is in line 20 and is adapted to close off communications between the heater means 16 and the collection system 15. It will readily be appreciated that the valves described above, taken in conjunction with blower 17 and the associated conduits are adapted to perform the function of causing the heated gaseous heating medium to flow from the heater means into the collection system while substantially no gases, normal leakages excepted, are flowing from the carbon black reactor through the collection system.

An example of a method of operating the above-described system will now be set forth. It is assumed that at the outset, the reactors and the collection system are "cold," that is they are all at nearly ambient temperature or only slightly above, so that the internals of the collection system have a temperature that is substantially lower than the dew point of normal reactor off-gases. To begin with, valve $V_1$ will be open and valve $V_2$ will be closed. The process of heating up the reactors is now begun by injecting fuel and air or other oxygen-bearing, combustion-supporting gas to the reactors 1, 2 and 3 through conduits 4 and 6 at rates which are substantially below those used in normal production of carbon black. The temperature of the reactors is gradually raised over a period of several days by slowly increasing the fuel and combustion-supporting gas feeds to the reactors. When the temperature of the off-gas reaches 600° to 1,000° F., the latter being about the maximum practicable operating temperature for the mild steel reactor discharge conduits which are so commonly used, the products of combustion are thereafter continuously quenched with water injected into the reactors through conduits 8, 9 and 10. The quenched off-gases may as a consequence contain as much as about 40% water vapor and may have a dew point of roughly 160° F. The quenched off-gas is vented to the atmosphere through valve $V_1$ and, because valve $V_2$ is closed, none of the moisture-laden quenched off-gas reaches the collection system, except to the extent of normal leakage through valve $V_2$.

Before, during, or after the attainment of normal operating temperature in the reactors, the blower 17 and heater 16 are started. Air and fuel are delivered to the heater through lines 20' and 18 respectively with the assistance of blower 17 and valve $V_6$. The air and fuel are combusted in the heater to produce hot combustion gases which are blended with by-pass air delivered through conduit 21. The proportion of by-pass air and combustion gas is regulated so that the temperature of the resultant mixture flowing through conduit 20 and conduit system 14 into collection system 15 via valve $V_3$ has a temperature which is at least about equal to the dew point of the moisture-laden off-gases from the reactors, e.g., at least about 160° F., and preferably substantially greater than 160° F. The contact between the internals of the collection system 15 and the mixture of gases from heater 16 and blower 17 results in a gradual raising of the temperature of said internals to a level above 160° F. Throughout this phase of the operation, the valve $V_3$ remains open and valve $V_4$ remains closed.

Once the internals of the collection system attain the above described temperature level, the moisture-laden quenched off-gases being generated in the reactors may therefore be discharged into the collection system at any time without fear of producing condensation on the internals thereof. Thus, the positions of the valves $V_1$, $V_2$, $V_3$, and $V_4$ can be reversed, thus causing the off-gas from the reactors to cease from flowing into the atmosphere and to flow through valve $V_2$ and conduit 14 through the collection system. The closing of valve $V_3$ and the opening of valve $V_4$ causes the heater means to begin discharging into the atmosphere and it may be shut down as soon as is convenient. The reactors can then be put on "inert" setting to purge the oxygen from the collection system and the introduction of feedstock into the reactors to produce carbon black may be begun at any convenient time thereafter.

As will be readily appreciated, it is preferred that the heat up cycle for the reactors and the operation of the heater means should take place simultaneously, the operations being timed so that the reactors reach full heat load and the collection system reaches a temperature in excess of the off-gas dew point at approximately the same time. However, it is not necessary to adhere to the preferred timing, it being quite possible to adopt any timing which may prove expedient or more convenient under particular circumstances. The primary requirement which must be borne in mind is that the temperature of the internals of the collection system should be at least substantially equal to the dew point of the reactor off-gas before the off-gas is introduced into the collection system.

The above description of operation was based on the assumption that the reactors and the collection system were both cold at the start. However, in actual operation of a carbon black plant, this may not always be the case. In view of lengthy procedure involved in both shutting down and starting up carbon black reactors, it is sometimes desirable to shut down and cool off a collection system to permit relatively quick internal repairs while maintaining reactor temperature and venting reactor off-gases to the atmosphere. It will be readily appreciated that the invention has utility in such a case, since the method of the invention is adapted to heat the internals of the collection system back up to a temperature at least substantially equal to the dew point of the reactor off-gases before the collection system is again put into service, thus preventing undue development of condensation in the collection system as a result of initiating the flow of reactor off-gases therethrough.

The carbon black producing system described above can be shut down in a manner having certain advantages over conventional practice. As explained in greater detail above, current practice is to adjust all reactors to an "inert" setting and cease the injection of hydrocarbon feedstock. The system is purged with "inert" gases for several minutes after the feedstock is cut off. Then, the reactors are adjusted to an excess oxygen setting. The complete collection unit can then be shut down by by-passing the reactors to the atmosphere, such as by closing those valves which would correspond to valves $V_1$ and $V_2$ in a conventional system. The collection unit is then purged by opening access doors and allowing ambient air from the atmosphere to circulate therethrough. The above procedure for shutting down is not entirely satisfactory as some condensation of residual reactor off-gases will occur in the collection system, and ordinarily there is no means provided for heating and drying the internals.

When a system constructed in accordance with the present invention is shut down, the conventional practice may be followed up to the point at which the reactors are normally by-passed to the atmosphere. Prior to by-passing the reactors to the atmosphere, the heater means is started up and brought up to operating temperature so that as the reactors are subsequently by-passed to the atmosphere, the gaseous heating medium from the heater means may be substituted or caused to flow through the collection system in place of the reactor off-gases, thus purging the collection system with warm dry air to remove the last vestiges of reactor off-gas before the collection system is permitted to cool. Then, the heater means may be shut down and the collection system may be opened to the atmosphere by opening access doors as previously discussed. This technique of shutting down the collection system is of course applicable to shut downs involving the collection system alone and those involving both the collection system and reactors.

It should be remembered that safe operating practice dictates that heated air and combustion gases from heater 16 should be admitted into the collection system 15 only after the conduit system 14 and the collection 15 have been purged with "inert" gas from the reactors to remove any remaining carbon black. The reactors can then be vented to the atmosphere and the air heater can be used to completely purge the collection system of wet reactor off-gases and prevent condensation. During short or prolonged shut downs, the heater means can be used to keep a collection system on stand-by for indefinite periods by continuously purging the internals thereof with warm gas, thereby practically eliminating any corrosion.

Among the advantages realized from the application of the invention is the ability to start up and shut down a collection system without condensation. Significant savings on equipment repair and replacement costs can be realized, especially in view of the elimination or considerable reduction of corrosion of internal metal parts and the lengthening of the life of bag filter unit filter bags. These bags are often made of glass fibers which, upon exhaustion of the protective agents with which they are coated, become quite sensitive to and are weakened by moisture. While the advantages of the invention have been described herein with particular reference to a carbon black production system, it will be readily apparent that the advantages of the applicant's method are of significant value in connection with any kind of plant or process wherein a bag filter or other type of gas-solids separation equipment is presently heated up and cooled down in the presence of gases heavily laden with moisture.

Now that illustrative embodiments of the method and apparatus aspects of the present invention have been set forth, it should be pointed out that these embodiments are only illustrative and are not intended to unduly limit the invention. Also, it should be understood that the method of the invention can be practiced in apparatus other than that specifically disclosed herein. For example, the heater means need not be a combustion-type heater. Instead, it would be possible to employ an indirect heat exchanger having two heat exchange circuits. Through one of such circuits, a hot fluid would be caused to flow. The gaseous heating medium intended for circulation through the collection system would flow through the other circuit of the heat exchanger and absorb heat from the hot fluid flowing in the first-mentioned circuit. Many other variations and modifications of the invention will readily suggest themselves to persons skilled in the art; therefore, the invention is a broad one and should not be regarded as being limited except as required by the appended claims.

What is claimed is:

1. Carbon black production apparatus, comprising: at least one furnace type carbon black reactor for the conversion of hydrocarbon feedstock to carbon black in the presence of hot combustion gases, said reactor having a discharge outlet for such carbon black and hot combustion gases; a collection system for separating such carbon black from such combustion gases, said collection system having internal surfaces susceptible to condensation of moisture; a conduit system interconnecting the reactor discharge outlet with the collection system; quenching means in the carbon black production system upstream of at least a part of the collection system; flow-inducing means connected with said collection system and with a source of gaseous heating medium of relatively low moisture content for causing said heating medium to flow from said source through said collection system; and heater means connected between said source of gaseous heating medium and said collection system for heating said gaseous heating medium prior to its entry into said collection system.

2. Apparatus in accordance with claim 1 wherein said flow-inducing means is a blower having a suction inlet in communication with the atmosphere for withdrawing air at ambient temperature therefrom and a pressure outlet connected with said heater means for delivering air to said heater means.

3. Apparatus in accordance with claim 2 wherein said heater means is a combustion type heater having a fuel inlet connected with a source of hydrocarbon fuel, an air inlet connected with the pressure outlet of said blower and a combustion gas outlet connected with said collection system.

4. Apparatus in accordance with claim 1 wherein means are provided in said conduit system for preventing any gases, normal leakages excepted, from flowing from said reactor into said collection system while said flow-inducing means is causing said gaseous heating medium of relatively low moisture content to flow through said collection system.

5. Carbon black production apparatus, comprising: a plurality of carbon black reactors for the conversion of hydrocarbon feedstock to carbon black in the presence of hot combustion gases, said reactors each having a discharge outlet for such carbon black and hot combustion gases; a collection system having at least one bag filter unit for separating such carbon black from such combustion gases, said collection system having internal surfaces susceptible to condensation of moisture; a conduit system interconnecting said reactor discharge outlets with the collection system; quenching means in said carbon black reactors; combustion type heater means having an air inlet, a fuel inlet a combustion chamber and a combustion gas outlet for converting air and fuel into combustion gases, said combustion gas outlet being connected with said conduit system through conduit means; blower means having a suction inlet in communication with the atmosphere and a pressure outlet connected with the air inlet of said heater means, said blower means performing the function of withdrawing air from the atmosphere and furnishing such air under pressure to said heater means for combustion therein to form a gaseous heating medium of relatively low moisture content that may flow through said collection system; and means for selectively cutting off communication between said reactors and said collection system while said heater means and blower means are in operation.

6. Apparatus in accordance with claim 5 wherein bypass conduit means are connected between the pressure outlet of said blower means and said conduit means for blending unheated air with combustion gases discharged from said heater means.

7. In the starting up of an idle bag filter unit which is sufficiently cooled to be at a lower temperature than the dew point of a hot, moisture-laden medium which is to be filtered therein whereby quantities of water vapor in said hot gaseous medium would be condensable on contact with the internals of said bag filter unit, the method which comprises: withdrawing air from the atmosphere; heating said air to a temperature in excess of the dew point of said hot, moisture-lade gaseous medium; and passing said heated air through said bag filter unit for a time sufficient to heat the internals of said bag filter unit to a temperature in excess of the dew point of said hot, moisture-laden gaseous medium; and, thereafter, beginning the introduction of said hot, moisture-laden gaseous medium into said bag filter unit.

8. In the shutting down of a bag filter unit which is in service in the filtration of a hot, moisture-laden gaseous solid-containing medium bearing sufficiently large quantities of water vapor to be condensible in said bag filter unit upon cooling to any substantial extent, said method comprising: withdrawing air from the atmosphere; heating said air to a temperature in excess of the dew point of said hot, moisture-laden gaseous medium; prior to cooling said unit below the dew point of said moisture-laden gaseous solids-containing medium, replacing the flow of said moisture-laden gaseous solids-containing medium with a flow of said heated air; and continuing the flow of said heated air until said unit has been purged of said moisture-laden gaseous solids-containing medium.

References Cited
UNITED STATES PATENTS

| | | | |
|---|---|---|---|
| 3,187,487 | 6/1965 | Loewen | 55—341 |
| 3,166,392 | 1/1965 | Keaton | 55—341 |
| 2,717,658 | 9/1955 | Bethea et al. | 55—97 |

JAMES H. TAYMAN, Jr., Primary Examiner

U.S. Cl. X.R.

23—259.5, 209.4, 209.6; 55—261, 341

PO-1050
(5/69)

UNITED STATES PATENT OFFICE
CERTIFICATE OF CORRECTION

Patent No. 3,464,184　　　　　　　　Dated September 2, 1969

Inventor(s) W. R. Wright

It is certified that error appears in the above-identified patent and that said Letters Patent are hereby corrected as shown below:

In Column 3, Line 25, "Deposite" should read --Despite--.

In Column 3, Line 66, "heated" is misspelled.

In Column 4, Line 17, "expected" should read --excepted--.

(SEAL)
Attest:

Edward M. Fletcher, Jr.
Attesting Officer

WILLIAM E. SCHUYLER, JR.
Commissioner of Patents